US009443046B2

(12) United States Patent
Meng

(10) Patent No.: US 9,443,046 B2
(45) Date of Patent: Sep. 13, 2016

(54) DETERMINING THE ELECTROMAGNETIC FIELD IN A COMPUTER AIDED DESIGN ENVIRONMENT

(71) Applicant: Toyota Motor Engineering & Manufacturing North America, Inc., Erlanger, KY (US)

(72) Inventor: Ming Michael Meng, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 296 days.

(21) Appl. No.: 13/653,071

(22) Filed: Oct. 16, 2012

(65) Prior Publication Data

US 2014/0107982 A1     Apr. 17, 2014

(51) Int. Cl.
*G06F 17/50*     (2006.01)
*H04B 15/02*    (2006.01)

(52) U.S. Cl.
CPC ......... *G06F 17/5036* (2013.01); *H04B 15/025* (2013.01); *G06F 17/50* (2013.01); *G06F 2217/82* (2013.01); *Y02T 10/82* (2013.01)

(58) Field of Classification Search
None
See application file for complete search history.

(56) References Cited

U.S. PATENT DOCUMENTS

| | | | |
|---|---|---|---|
| 5,745,370 A * | 4/1998 | Ohtsu et al. | 716/115 |
| 5,812,434 A * | 9/1998 | Nagase et al. | 703/2 |
| 6,083,266 A | 7/2000 | Ohtsu et al. | |
| 7,299,168 B2 | 11/2007 | Rappaport et al. | |
| 7,558,706 B1 * | 7/2009 | Hoyler | G06F 17/5018 324/457 |
| 8,049,503 B2 * | 11/2011 | Kimura et al. | 324/319 |
| 8,198,899 B2 * | 6/2012 | Lindqvist | 324/365 |
| 2003/0052395 A1 * | 3/2003 | Nakamura et al. | 257/678 |
| 2006/0132118 A1 * | 6/2006 | Maekawa et al. | 324/96 |
| 2008/0028352 A1 * | 1/2008 | Birch et al. | 716/12 |
| 2009/0167308 A1 * | 7/2009 | Lomes | 324/326 |
| 2010/0113959 A1 * | 5/2010 | Pascual-Leone et al. | 600/544 |
| 2011/0004450 A1 * | 1/2011 | Mishelevich et al. | 703/2 |

OTHER PUBLICATIONS

R. Neumayer, et al., "Continuous simulation of system-level automotive EMC problems," 2003 IEEE International Symposium on Electromagnetic Compatibility, Aug. 18-22, 2003, pp. 409-413.*

(Continued)

*Primary Examiner* — Kamini S Shah
*Assistant Examiner* — David M Rogers
(74) *Attorney, Agent, or Firm* — Dinsmore & Shohl LLP

(57) ABSTRACT

Examples of the invention include methods and apparatus for determining an electromagnetic field, such as a magnetic field, at a selected location within computer-aided design (CAD) data. An example approach may include selecting a location by clicking on, or otherwise selecting the location within a visual representation of the CAD data, selecting one or more electrical components within the CAD data, retrieving electrical current data and distance data for each of the selected electrical components, and determining the electromagnetic field at the selected location using electromagnetic theory. Examples of the invention allow rapid determination of potential electromagnetic noise problems in the CAD design stage, before prototyping and without the complexity of a full 3D electromagnetic simulation.

15 Claims, 2 Drawing Sheets

(56) References Cited

OTHER PUBLICATIONS

M. Zerrer, et al., "Estimation of electromagnetic coupling phenomena in a vehicle wiring harness using characteristic transfer functions," 18th International Zurich Symposium on Electromagnetic Compatibility, EMC, Zurich, Sep. 24-28, 2007, pp. 167-170.*

S. Petrovski, et al., "Data-driven modelling of electromagnetic interferences in motor vehicles using intelligent system approaches," 2013 IEEE International Symposium on Innovations in Intelligent Systems and Applications (INISTA), Jun. 19-21, 2013, pp. 1-7.*

Sun, Shishuang, et al., "Anticipating EMI and On-Board Interference in Automotive Platforms," International Symposium on Electromagnetic Compatibility, EMC 2004, vol. 3, pp. 792-797. IEEE, 2004.*

* cited by examiner

| Parameter | EM Level |
|-----------|----------|
| Pi | 30 gauss |

DETERMINING THE ELECTROMAGNETIC FIELD IN A COMPUTER AIDED DESIGN ENVIRONMENT

FIELD OF THE INVENTION

The invention relates to apparatus and methods for equipment design, in particular, vehicle design.

BACKGROUND OF THE INVENTION

Computer-aided design (CAD) is well known and extensively used in vehicle design. CAD approaches allow evaluation of the mechanical arrangements of components. This is useful, as the relative orientation and arrangement of components can be evaluated without fabricating a prototype.

SUMMARY OF THE INVENTION

Examples of the invention include improved methods and apparatus for determining the electromagnetic field level for a point of interest within a mechanical design. Examples include fast and reliable computational tools to determine electromagnetic parameters within a three-dimensional (3D) CAD environment. Approaches allow design engineers to determine the likelihood of electromagnetic interference and evaluation of any necessary shielding. Currently, 3D CAD packaging systems are used to determine the mechanical arrangement of components within a vehicle design. Similarly, electrical circuit design tools may be used to evaluate the current flow in certain electrical configurations. However, conventional CAD programs provide no information relating to electromagnetic noise problems, and electrical circuit design tools do not generally consider the physical arrangement of electrical components.

Conventional CAD design tools do not allow the calculation of electromagnetic field levels using the CAD data. Examples of the present invention allow a simple evaluation of an electromagnetic parameter (such as the magnetic field, electric field, or electromagnetic field levels) at a predetermined location based on electrical parameters associated with one or more proximate electrical components. This is extremely useful when designing equipment including electrical components near a location that is sensitive to electromagnetic interference. For example, the design of the antenna input within a vehicle is sensitive to the configuration of a wiring harness close by, and it is difficult using conventional tools to determine if there is a likelihood of electromagnetic interference at the antenna feed due to the wiring harness.

CAD data provides information on the relative spatial positioning of various components within an equipment design. The CAD data can be used to determine the distance between a selected electrical component and a predetermined location within the equipment. The predetermined location may be the location of a component that is sensitive to electrical noise, such as a component of a vehicle entertainment system. Electrical data for the component may be retrieved from a database, electrical simulation, user data entry, or otherwise determined. The combination of an electrical parameter, such as a direct current, and spatial location relative to the predetermined location, allows the magnetic field at the predetermined location to be calculated using a mathematics model based on electromagnetic theory.

In an improved CAD system according to an example of the present invention, a user may specify a point of interest as the selected location. Electrical components that proximate the selected location are then selected, and the electromagnetic field at the selected location due to those proximate electrical components is then calculated. For example, the magnitude of magnetic and/or electrical fields at the selected location may be calculated. An electromagnetic simulation module may be used to collect the current and distance information for each of the selected electrical components. The distance information may be determined directly from the CAD data, using the position data within the CAD design. Electrical current data, and/or other electrical data, for each selected component may be obtained from a database, such as a lookup table in which each electrical component has associated electric current data. In some examples, current data may be found from electrical simulations of a circuit design, and associated with each component. The electromagnetic simulation module then determines the electromagnetic field, such as the magnetic field due to DC or AC currents, at the point of interest (the selected or predetermined location). The calculation result may then be displayed on the CAD system and associated with the selected location. The calculated field may be shown on the same electronic display as used to show a 3D representation of the CAD data.

Examples of the present invention include electromagnetic simulation approaches that may be embedded within conventional 3D CAD packaging software. The software used to determine the electromagnetic field may be termed an electromagnetic simulation module (ESM). The ESM may obtain CAD and electrical data, and provide a fast and reliable tool for a design engineer to determine the electromagnetic field level at the selected location in a vehicle environment. The design process may then include comparing the determined electromagnetic field level with a threshold level that is considered acceptable. The data may be used to move or shield electrical cables or the signal lines that are susceptible to electromagnetic noise, such as antenna feeds within an automobile.

A method of calculating an electromagnetic field (such as a magnetic field) in a CAD environment is as follows. A user specifies a point of interest for which electromagnetic field levels are caused by surrounding components by clicking on the selected location in the CAD system display. For example, the AM/FM radio noise level caused by the surrounding components in the vehicle may be determined by selecting the location as the antenna feed. The surrounding components used in the electromagnetic field level calculation are then selected. A software program, which may be termed the ESM (Electromagnetic Simulation Module) then gathers the electric current and distance information relating to the surrounding electrical components. The electric current data may be stored in a database accessible by the ESM. The ESM then calculates the electromagnetic field at selected points using electromagnetic theory (such as Ampere's Law), using the current data and distance to the selected point for each selected component.

The electric current data for the selected electrical components may include one or more of the following: maximum rated current, typical operating current, current transients, and/or dynamic data. The distance data represents the distance from the selected component to the selected point of interest. The distance data may include an average distance, closest distance, distance from the center of the component (or other selected component portion) to the selected location, or other distance information as desired. The calculated electromagnetic parameter (such as electromagnetic or magnetic field value at the selected location) is then displayed on the CAD system, optionally on the same screen as used to display the CAD data.

After display of the electromagnetic parameter, such as magnetic field at the selected location, the user may then perform one or more of the following: adjust the location of the selected point (and any component or cable the point is associated with), adjust the location of one or more electrical components, introduce shielding, adjust current data for the selected component (for example, by modifying the maximum allowable current or adjusting the properties of the selected component), and the like.

Examples of the invention include a computerized apparatus allowing a user working in a CAD environment to find the electromagnetic field at a selected location. As an example, an apparatus through software executed by a processor within the apparatus, prompts the user to select a location in the CAD workspace where the electromagnetic field is desired, and then prompts the user to select which electronic components should be used to calculate the field at the selected location. An Electromagnetic Simulation Model (ESM) then finds the electric current flowing through the selected components, and calculates the distance from the components to the location. The ESM System uses the electrical current data, the distance data and electromagnetic field theory to calculate the field magnitude at the selected location. The magnitude of the field may be displayed alongside a visual representation of the CAD data.

DETAILED DESCRIPTION OF THE PREFERRED EMBODIMENTS

Examples of the present invention include apparatus and methods that allow a user working in a CAD environment to determine the electromagnetic field, such as magnetic field, at a selected location. The user may be prompted to select a location in the CAD workspace, in order to determine the electromagnetic field at that location. The user then selects one or more electrical components which may influence the field at the selected location. A computational process, which may be termed an electromagnetic simulation model (ESM), then uses the electric current flowing through each component, and the distance from the components to the selected location, to determine the field magnitude at the selected location. The distance data may be obtained from the CAD data, using the known 3D position of each component within the equipment design. The electric current data may be obtained from an associated database, such as a lookup table, and/or in combination with the distance data, which is then used to determine electromagnetic components at the selected location resulting from each electrical component. The total magnitude of the field is then calculated, and may be determined and displayed to the user as part of the CAD display.

Unlike three dimensional electromagnetic simulations, the computational demands of example processes are relatively low, so the data may be quickly determined, facilitating rapid re-design if necessary. In examples of the present invention, the user may select a relatively small number of electrical components, such as 1-10, and may be rapidly presented with electromagnetic data at the selected location. In such examples, the calculated electromagnetic field may dynamically change as the predetermined location (and/or location of an electrical component) is changed. For example, a location sensitive to electrical noise (such as an antenna feed) may be moved within the equipment design, and the revised field determined and displayed as the location is moved.

In some examples, apparatus and methods according to the present invention may be used to determine limits on the current flow through a particular electrical component, in order to avoid producing a magnetic field in excess of a predetermined value. In such examples, the current flow may be scaled by the user, and the resulting field at a predetermined location may be modified accordingly.

Figures 1, 2:
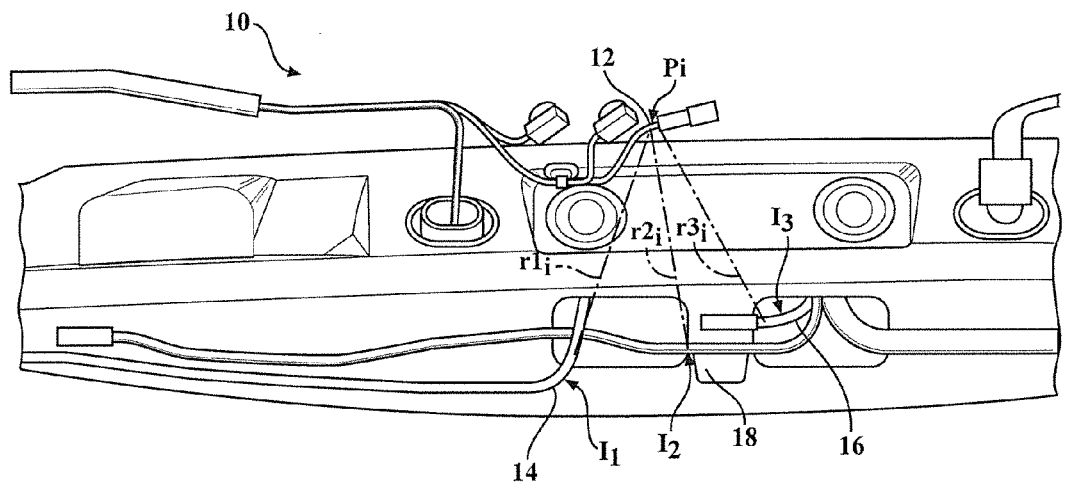
FIG. 1 shows a representative screen shot showing CAD data, and helps illustrate an improved method of determining the electromagnetic field level at a selected location.
FIG. 2 is a screen display that may be shown on the same screen as the CAD rendering.

FIG. 1 shows a representative CAD display of vehicle components, shown generally at 10. The selected location is indicated at $P_i$, and corresponds to element 12, which in this example is an antenna cable for a vehicle audio system, which may also be referred to as the antenna feed. This location may be particularly sensitive to electromagnetic noise, as electromagnetic fields may induce audio noise perceivable by a vehicle user on operation of the vehicle entertainment system.

A design engineer may select the antenna cable as the predetermined location, and then determine the magnetic field at this location in response to electrical currents flowing through selected electrical components. Electrical components may include a cable, wire, motor, lamp, or other electrical component carrying significant current during operation of the component. For example, location 14 relates to part of the vehicle wiring harness. The maximum current flowing through this harness may be stored in a database. When this component is selected, the current data, for example the maximum current flowing through the component during operation, is retrieved and is shown as $I_1$. Distance data is also determined for the selected component, in this case the physical distance ($r1_i$) between the component and the selected location 12. The distance data is readily determined from the CAD data. The magnetic field at the selected location 12 is then determined using any appropriate electromagnetic calculation method, such as Ampere's law, using the current data and the distance data.

A design engineer may select one or more electrical components in order to determine their effect on the electromagnetic field at location 12. Second and third selected components are indicated at 14 and 16, each being cables with currents $I_2$ and $I_3$ respectively. The total electromagnetic field at the selected location is then determined using the electromagnetic fields resulting from each component. The total electromagnetic field may be a static magnetic field. The field may be compared against maximum allowable thresholds for the selected location, associated with component 12.

In this way, electromagnetic problems such as noise may be avoided in an early stage of the design. In a conventional approach, excessive noise at a selected location $P_i$ may only be realized after some further degree of prototyping, leading to delays in vehicle design and escalating costs.

If the magnetic field at the predetermined location exceeds a threshold value, the design engineer immediately has the option to move the predetermined location (such as the location of a cable) away from the electrical component of concern, or introduce additional shielding. In a conventional approach, it may be decided to routinely add shielding at each and every location of possible concern. However, this may be inefficient and add unnecessary costs to the equipment design. The rapid determination of electromagnetic data using the CAD design system allows rapid and simple design of equipment, such as a vehicle, that is not plagued by electromagnetic noise problems.

Conventionally, the CAD environment provides no information on electromagnetic properties. Typical CAD data has no suggestion that electromagnetic field problems may arise. Similarly, conventional electrical circuit simulations usually operate with a schematic circuit diagram, and there is no appreciation of the role of physical distance in the origin of electromagnetic noise problems. Examples of the present invention allow rapidly improved equipment designs to be made. Electromagnetic noise problems may be detected far earlier in the equipment design process than using conventional approaches.

In FIG. 1, the cable 14 may carry electrical current to a stoplight or similar vehicle lamp fixture. Hence, the electrical current may be appreciable, and electromagnetic problems may be expected within proximate locations. However, conventional approaches do not allow even an estimation of such problems. Full three-dimensional electromagnetic simulations have been used in unrelated fields. However, it may not be time or cost effective to produce a full three dimensional electromagnetic simulation of an early stage design, e.g., of equipment such as a vehicle. Using examples of the present invention, sources of problems may be rapidly identified and eliminated, without the use of full three-dimensional electromagnetic simulation. In some cases, the electromagnetic parameter, such as magnetic field at the selected location, may be dynamically updated as the selected location and/or selected surrounding field sources are moved around within the CAD data representation of the equipment.

The determined electromagnetic field may be displayed on the CAD screen, as shown at 30 in FIG. 2. The calculations may be carried out in the background, and delays may be negligible. The electromagnetic field level may be compared to a design criterion, such as a magnetic field level maximum acceptable at the particular location. The components or the location may be moved, relative to each other, or additional shielding introduced, in order that the determined field level falls below a criterion. In this example, the electromagnetic parameter determined is a static magnetic field arising from direct currents. However, examples of the present invention also include determination of the effects of alternating currents, transients, and the like, using analogous approaches. Determined electromagnetic parameters at the selected location may include magnitudes of magnetic, electric, and/or electromagnetic fields, and in the case of alternating currents may also include dynamic values such as time-dependent fields, phase information, and the like.

FIG. 2 is an example screen display that may be shown on the same screen as the CAD rendering. One or more electromagnetic parameters, such as the magnetic field may be shown, and in some cases the relative contributions of the selected components responsible for the magnetic field may also be shown.

Figure 3:
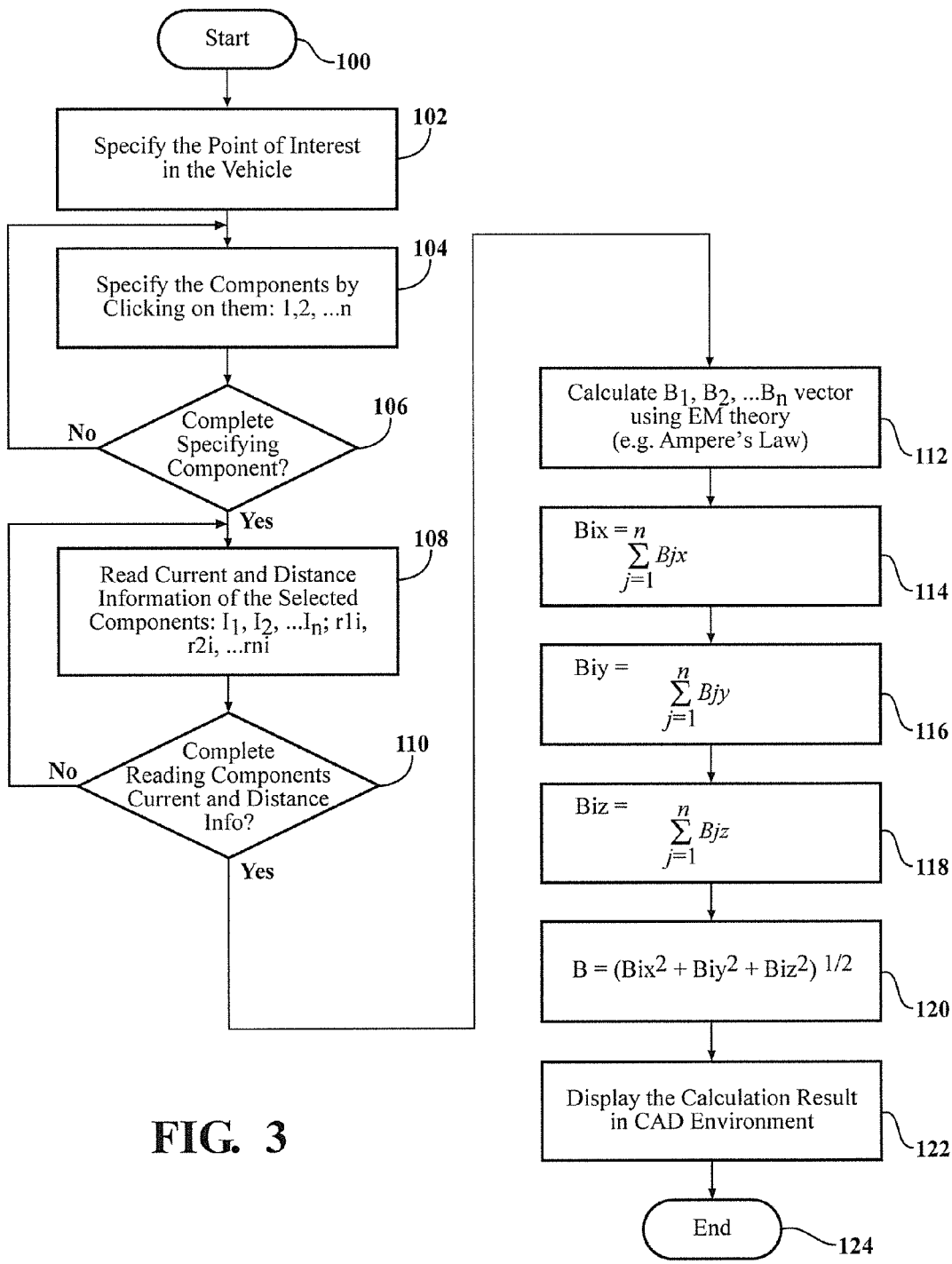
FIG. 3 show a flowchart by which the electromagnetic field level is determined and displayed to a user.

FIG. 3 shows a flowchart showing an example process for determining a magnetic field at the selected location. Box 100 represents the start of the process, which may represent selection of the ESM (electromagnetic simulation module). Box 102 represents the user specifying a point of interest within the CAD data. The user may be prompted to select the point of interest. Certain components or locations may be indicated to the design engineer as being of concern in relation to electromagnetic noise, and the user may be prompted to determine the field location at various locations. In other examples, the user may not need to select the point of interest, but the process automatically selects one or more locations of known concern.

Box 104 represents selecting one or more electrical components, which may be labeled 1, 2, . . . n in the case of n components, and Box 106 checks to see if the user has completed specifying the components.

Box 108 represents determining current and distance information for each of the selected components. For example, the electrical current associated with the first component may be labeled $I_1$ and similarly for other components. The distance information for the first components may be indicated as $R_1$, and similarly for other components. The electrical current data for each component may be obtained from an associated database, which may be accessible through background processes from the CAD program. The database may include an electrical load list, in which current data is associated with various electrical components, and this may be used to provide the electrical current data.

Box 110 corresponds to checking to see that all appropriate electrical current and distance information has been acquired. The distance information may be determined from the CAD data. The relative three dimensional locations of each equipment component are known from the CAD data, and it is a straightforward calculation to determine the straight line distance between two components within the design.

Box 112 corresponds to calculating the magnetic field at the point of interest produced by each component. These may be labeled $B_1$ for the first field induced by the first electrical component, and similarly for each other component. The magnetic fields may be calculated using any appropriate electromagnetic theory, such as Ampere's Law.

Boxes 114-118 correspond to summing the contributions of each magnetic field component to the total electromagnetic field. Vector addition may be used, or any appropriate method, and it is not necessary to use Cartesian components, though this is used as a representative example. Box 114 corresponds to summing the x components, Box 116 corresponds to summing the y components, and Box 118 corresponds to summing the z components. Box 120 corresponds to calculating the magnetic field magnitude at the selected location (the specified point of interest) from the determined magnetic field components. In some examples, the magnetic field magnitude is all that is required. In other examples, the magnetic field vector at the point of interest may be determined.

Box 122 corresponds to displaying the calculated magnetic field within the CAD environment. For example, a pop-up box may be displayed on the same screen that a design engineer uses to see the CAD data. In other examples, the data may be displayed on a separate screen or within a separate window, as desired. Box 124 corresponds to the end of the program, for example by closing the ESM. However, in some examples the ESM remains open and corresponding field changes shown as adjustments are made to the CAD data.

The process shown in FIG. 3 may be run as a background calculation while the design engineer is examining the CAD rendering on the display. One or more points of interest may be selected by the user, for example in response to prompts from the program, predetermined points of interest, or algorithmic suggestions of locations likely to be of concern. The calculation may be dynamically abated as the point of interest, which may be associated with a component and moved within the CAD landscape. For example, the magnetic field at an antenna feed may be updated as the engineer moves the location of the antenna feed within the CAD environment. In some examples, the field suppression effect of shielding may be included within the calculation. As the engineer introduces shielding, the calculated field may decrease. In this way, the necessity and amount of electromagnetic shielding may be determined in real time as a point of interest is selected and moved within the environment. No previous system has allowed such rapid presentation of electromagnetic data during a mechanical design process within a CAD system. Examples of the present invention may be implemented as a software module, such as midware embedded within any suitable commercially available CAD system or proprietary CAD system. The electromagnetic simulation module may be embedded within the CAD environment, allowing a design engineer to obtain rapid field calculations for a particular three dimensional arrangement of electrical components. In some examples, the field at two or more selected locations may be determined simultaneously (or sequentially) by using a similar approach, i.e., using the current data for each component, and the appropriate distances between each component and each of the selected locations.

Examples of the present invention include a computer-readable medium including instructions executable by a computer system to determine an electromagnetic field at a selected location within CAD data (computer-aided design data). The computer system may include a processor to execute the instructions. The instructions allow the computer system, under control of a user, to select a location within the CAD data, for example using a computer input device such as a stylus, mouse, touch-screen or other user input device. One or more electrical components within the CAD data are selected in a similar manner. Electrical current data for each of the one or more electrical components is retrieved from a computer memory element, for example from a database listing the electrical properties of electrical components used in the design represented by the CAD data. Distance data is then determined for each of the electrical components, the distance data being determined from the locations of the selected point and the electrical components within the CAD data. The electromagnetic field is determined at the selected location using the electrical current data and the distance data, for example by determining magnetic field components due to each selected component, with vector addition of the components. The electromagnetic field is then presented on an electronic display, for example as a magnetic field in gauss.

The electromagnetic field may be compared to a threshold value, and the computer system used to provide an alert if the threshold value is exceeded. A user may then use the computer system to modify the CAD data, by moving component representations within the CAD data, and the electromagnetic field is recalculated. This process may be used to show changes in the field in real time as the component or selected position is modified.

Example applications include aviation design, the design of any vehicle having electrical components, and the design of any equipment including current-carrying components susceptible to electromagnetic noise or other related problems. Examples include conventional automobiles, including electrically powered automobiles. The described approach is the first implementation of a system allowing electrical properties, such as electromagnetic noise, to be evaluated within a mechanical design environment.

Examples may use direct constant currents in order to determine a constant magnetic field resulting at the predetermined point. In other examples, current transients and dynamic electrical signals may be evaluated in order to evaluate noise at a predetermined location. The electrical data may be determined in separate electrical simulations for the components of interest, independent of the three dimensional configuration of those components if desired. The determined electrical data may then be stored in a database, accessible by the mechanical design software and embedded electromagnetic simulation module, to allow the ESM to determine electromagnetic fields at predetermined points within the mechanical design, as a consequence of electrical signals stored within the database.

Examples of the invention include a software tool that may be embedded in CAD software, such as 3D packaging software, to automatically calculate the electromagnetic field level for the selected point of interest. This provides a rapid and convenient approach to obtaining the electromagnetic field level at the point of interest, and to judge if the packaging conditions allow unacceptable EMC interferences or radio noise. The software may be provided as software (such as midware) to be embedded in a commercial or proprietary CAD system. The software may be configured to work with commercial CAD systems such as CATIA (Computer aided three-dimensional interactive application, Dassault Systemes, France), UG (Unigraphics, Siemens PLM Software, Plano, Tex.), or other CAD systems. The software allows automatic calculation of the electromagnetic field level at selected locations in a vehicle or other equipment, using the 3D position data in the CAD system and electrical current data associated with current-carrying electrical components.

Currently, there is no 3D packaging system that allows the automatic calculation of an electromagnetic field level using the 3D CAD data. In particular, antenna and wiring harness engineers would greatly benefit from using the tool to determine electromagnetic data, allowing reasoned judgment of required packaging conditions.

The electrical current data for components may include maximum currents, typical currents, or in some cases the electromagnetic fields at the predetermined points may be calculated for a variety of conditions such as maximum current, typical current, operation of one or more selected components but not others, or using dynamic circuit parameters estimated or simulated for the selected electrical components.

The invention is not restricted to the illustrative examples described above. Examples described are not intended to limit the scope of the invention. Changes therein, other combinations of elements, and other uses will occur to those skilled in the art.

Having described my invention, I claim:

1. A method of determining an electromagnetic field of a wiring harness system at a selected location, the method being performed by a computer system having an electronic display, the method including:
   providing CAD data, the CAD data being computer-aided design data including the cabin space of an automotive vehicle having a wiring harness system;
   selecting the selected location within the CAD data, the selected location being the location of an antenna;
   selecting one or more electrical components within the CAD data, wherein the electrical components include at least one of a cable, a wire, a motor or a lamp;
   providing a lookup table having electrical current data for each of the one or more electrical components;

retrieving electrical current data for each of the one or more electrical components from the lookup table;

identifying distance data for each of the one or more electrical components, the distance data being determined from the locations of the antenna and the one or more electrical components within the CAD data;

calculating a calculated electromagnetic field at the antenna using both the electrical current data and the distance data, wherein the calculated electromagnetic field is the summing contribution of each magnetic field component in three dimensional space; and presenting a visual representation of the calculated electromagnetic field on the electronic display, wherein a relative contribution (Brel(j)) of the selected components responsible for the magnetic field is shown, and wherein the relative contribution (Brel(j)) is determined by the following equation, where j=1, 2. . . N, and N is the number of selected components, Bj is the calculated magnetic field of the selected components, Bi is the calculated magnetic field of the wire harness system at the selected location, and wherein x, y, and z refer to the respective contributions of the magnetic fields in three dimensional space:

$Brel(j)=(Bj/Bi)\times 100$ $Bj=(Bjx^2+Bjy^2+Bjz^2)^{1/2}$ $Bi=(Bix^2+Biy^2+Biz^2)^{1/2}$ so as to determine the electromagnetic field at the antenna, and the contribution of each of the selected components to the electromagnetic field at the antenna.

2. The method of claim 1, wherein retrieving electrical current data includes obtaining electrical current data for each of the one or more electrical components from a database electronically accessible by the computer system.

3. The method of claim 1, the electrical current data being direct current data.

4. The method of claim 1, the calculated electromagnetic field being a calculated magnetic field, the method being a method of determining the magnetic field at the selected location.

5. The method of claim 1, the electronic display also being used to present the CAD data.

6. The method of claim 1, the method being performed by software executed by a processor within the computer system.

7. The method of claim 6, the CAD data being generated by a computer-aided design program (CAD program), the CAD program being executed by the processor within the computer system.

8. The method of claim 7, the software being a software module called by the CAD program.

9. The method of claim 7, further including:

comparing the electromagnetic field to a threshold field; and using the CAD program to modify the CAD data if the electromagnetic field exceeds the threshold field, so as to reduce the electromagnetic field.

10. The method of claim 1, wherein the antenna is an AM/FM radio antenna.

11. An apparatus for determining an electromagnetic field at a selected location, the apparatus including:

a computer system, operable to process computer-aided design data (CAD data), the CAD data representing a wiring harness system disposed within an automotive vehicle;

an input mechanism for selecting the selected location, the selected location being the location of an antenna and an electrical component within the CAD data, the electrical component being at least one selected from the group consisting of a cable, a wire, a motor and a lamp;

an electronic display, used to present the CAD data and the electromagnetic field at the selected location, the computer system being operable to:

identify the selected location and the electrical component within the CAD data, retrieve electrical current data for the electrical component, determine a distance between the antenna and the electrical component using the CAD data, calculate a calculated electromagnetic field at the selected location using the electrical current data and the distance data, wherein the calculated electromagnetic field is the summing contribution of each magnetic field component in three dimensional space;

and present a visual representation of the calculated electromagnetic field on the electronic display, calculating a relative contribution (Brel(j)) of each of the selected components contributing to the calculated electromagnetic field, wherein the relative contribution (Brel(j)) is determined by the following equation, where j=1, 2. . . N, and N is the number of selected components, and B j is the calculated magnetic field of the selected components, and Bi is the calculated magnetic field of the wire harness system at the selected location, and wherein x, y, and z refer to the respective contributions of the magnetic fields in three dimensional space:

$Brel(j)=(Bj/Bi)\times 100$ $Bj=(Bjx^2+Bjy^2+Bjz^2)^{1/2}$ $Bi=(Bix^2+Biy^2+Biz^2)^{1/2}$ and the apparatus being operable to determine the electromagnetic field at the selected location within the CAD data and display the relative contribution of each of the selected components contributing to the calculated electromagnetic field.

12. The apparatus of claim 11, wherein retrieving electrical current data includes obtaining electrical current data for the electrical component from a database supported by the computer system.

13. The apparatus of claim 11, the input mechanism being operable to select a plurality of electrical components within the CAD data, the plurality of electrical components including the electrical component, the computer system being further operable to:

identify the plurality of electrical components within the CAD data, retrieve electrical current data for each of the plurality of electrical components, determine distance data including distances between each of the plurality of the electrical components and the selected location, and determine the electromagnetic field at the selected location using the electrical current data and the distance data.

14. The apparatus of claim 11, the electromagnetic field being a magnetic field, the computer system being operable to determine a magnitude for the magnetic field at the selected location.

15. The apparatus of claim 11, wherein the antenna is an AM/FM radio antenna.

\* \* \* \* \*